US011196967B1

(12) United States Patent
Lee et al.

(10) Patent No.: US 11,196,967 B1
(45) Date of Patent: Dec. 7, 2021

(54) IMAGE INSPECTION DEVICE

(71) Applicants: HE TONG TECHNOLOGY CO., LTD., Tainan (TW); WEN CHIN TECHNOLOGY CO., LTD., Kaohsiung (TW)

(72) Inventors: Yi-Ning Lee, Tainan (TW); Ying-Nan Chen, Kaohsiung (TW)

(73) Assignees: He Tong Technology Co., Ltd., Tainan (TW); Wen Chin Technology Co., Ltd., Kaohsiung (TW)

( * ) Notice: Subject to any disclaimer, the term of this patent is extended or adjusted under 35 U.S.C. 154(b) by 0 days.

(21) Appl. No.: 16/891,150

(22) Filed: Jun. 3, 2020

(51) Int. Cl.
*H04N 7/18* (2006.01)
*H04N 5/225* (2006.01)
(Continued)

(52) U.S. Cl.
CPC ............. *H04N 7/181* (2013.01); *B07C 5/342* (2013.01); *B65G 47/46* (2013.01); *B65G 47/525* (2013.01); *G06T 7/0004* (2013.01); *H04N 5/2253* (2013.01); *H04N 5/2254* (2013.01); *H04N 5/2256* (2013.01); *H04N 5/23296* (2013.01); *H04N 5/247* (2013.01);
(Continued)

(58) Field of Classification Search
CPC .... H04N 7/181; H04N 5/2256; H04N 5/2253; H04N 5/23296; H04N 5/247; H04N 5/2254; B65G 47/525; B65G 47/46; B65G 2203/041; B65G 2812/14; G06T 7/0004; G06T 2207/30108; B07C 5/342
See application file for complete search history.

(56) References Cited

U.S. PATENT DOCUMENTS 5,298,989 A * 3/1994 Tsukahara ............... H01L 24/78
   348/126
6,346,982 B1 * 2/2002 Yasuda ............... G01N 21/8903
   356/237.1
(Continued)

FOREIGN PATENT DOCUMENTS

CN    207046333 U    2/2018
JP    2010-101863 A   5/2010
(Continued)

OTHER PUBLICATIONS

Specifications for Computar H10Z1218PDC camera, XP055751214 (Aug. 2000). Retrieved from https://www.vision-dimension.com/media/pdf/b8/98/9b/H10Z1218PDC_Datasheet.pdf.
(Continued)

*Primary Examiner* — Richard A Hansell, Jr.
(74) *Attorney, Agent, or Firm* — Rosenberg, Klein & Lee

(57) ABSTRACT

An image inspection device has a platform, a controlling unit, multiple image capture units, and a discharging unit. The platform has a carrier being capable of rotating for carrying products under inspection. The controlling unit is capable of controlling rotation of the carrier. The image capture units are disposed around the platform and electrically connected to the controlling unit. Each image capture unit has a zoom lens electrically connected to the controlling unit for transmitting digital information of images captured by the zoom lens to the controlling unit. The discharging unit is configured to move the products under inspection away from the carrier and electrically connected to the controlling unit.

13 Claims, 11 Drawing Sheets

(51) Int. Cl.
*H04N 5/232* (2006.01)
*H04N 5/247* (2006.01)
*G06T 7/00* (2017.01)
*B65G 47/52* (2006.01)
*B65G 47/46* (2006.01)
*B07C 5/342* (2006.01)

(52) U.S. Cl.
CPC .... *B65G 2203/041* (2013.01); *B65G 2812/14* (2013.01); *G06T 2207/30108* (2013.01)

(56) References Cited

U.S. PATENT DOCUMENTS

| | | | | |
|---|---|---|---|---|
| 8,107,720 | B2* | 1/2012 | Wang | G06T 7/0006 |
| | | | | 382/145 |
| 2003/0227544 | A1* | 12/2003 | Hara | B07C 5/366 |
| | | | | 348/92 |
| 2007/0205084 | A1* | 9/2007 | Kobayashi | G01R 31/013 |
| | | | | 198/689.1 |
| 2007/0273877 | A1* | 11/2007 | Kawano | G01N 21/6458 |
| | | | | 356/318 |
| 2009/0251815 | A1* | 10/2009 | Wang | G01N 21/95 |
| | | | | 360/31 |

FOREIGN PATENT DOCUMENTS

| | | | |
|---|---|---|---|
| JP | 2012-171628 A | | 9/2012 |
| JP | 2015-163843 A | | 9/2015 |
| KR | 20010096556 A | * | 11/2001 |
| WO | 94/024675 A1 | | 10/1994 |

OTHER PUBLICATIONS

Search Report for counterpart European Application No. 20178296.8, dated Nov. 30, 2020.

Office Action for corresponding Japanese Application No. 2020-111580, dated Aug. 31, 2021.

* cited by examiner

IMAGE INSPECTION DEVICE

BACKGROUND OF THE INVENTION

1. Field of the Invention

The present invention relates to an image inspection device, and more particularly to an image inspection device that is able to improve accuracy of examinations.

2. Description of Related Art

Image inspection is a modern measuring method extensively applied in various technical fields. When image inspection is processed by a conventional image inspection device, a product under inspection is conveyed by a conveyor to pass between a light emitting element and an image capture unit. The light emitting element emits light on the product under inspection. The image capture unit captures images of the product under inspection by an image sensor such as the charged-coupled device (CCD). The image sensor converts outline of the product under inspection into digital information and transmits the digital information to a computer. The digital information is analyzed and compared to reference data by the computer. Then the computer determines whether the digital information of the product under inspection meets requirement and shows results on a monitor of the computer. The computer transmits the results to a discharging unit to discharge the product under inspection that is defective. Speed of the image inspection is fast and the results of the image inspection are reliable. Therefore, the image inspection is extensively applied in various technical fields.

As the products under inspection include a variety of types, the products under inspection have distinct sizes and outlines. Staff has to change positions of the image capture unit manually for focusing. However, the single image capture unit can get limited digital information. Position of the image capture unit would not be accurate due to manual adjustment. Inaccurate position of the image capture unit can cause the computer to output erroneous results. Manually adjusting positions of the image capture unit makes the image inspection restricted by scene of inspection. To overcome the shortcomings of the conventional image inspection device, the present invention provides an image inspection device to mitigate or obviate the aforementioned problems.

SUMMARY OF THE INVENTION

The main objective of the present invention is to provide an image inspection device that improves accuracy of inspection and is free from being restricted by scene of inspection when inspecting.

The image inspection device has a platform, a controlling unit, multiple image capture units, and a discharging unit. The platform has a carrier being capable of rotating for carrying products under inspection. The controlling unit is capable of controlling rotation of the carrier. The image capture units are disposed around the platform and electrically connected to the controlling unit. Each image capture unit has a zoom lens electrically connected to the controlling unit for transmitting digital information of images captured by the zoom lens to the controlling unit. The discharging unit is configured to move the products under inspection away from the carrier and electrically connected to the controlling unit.

Other objects, advantages, and novel features of the invention will become more apparent from the following detailed description when taken in conjunction with the accompanying drawings.

DETAILED DESCRIPTION OF PREFERRED EMBODIMENTS

Figure 1:
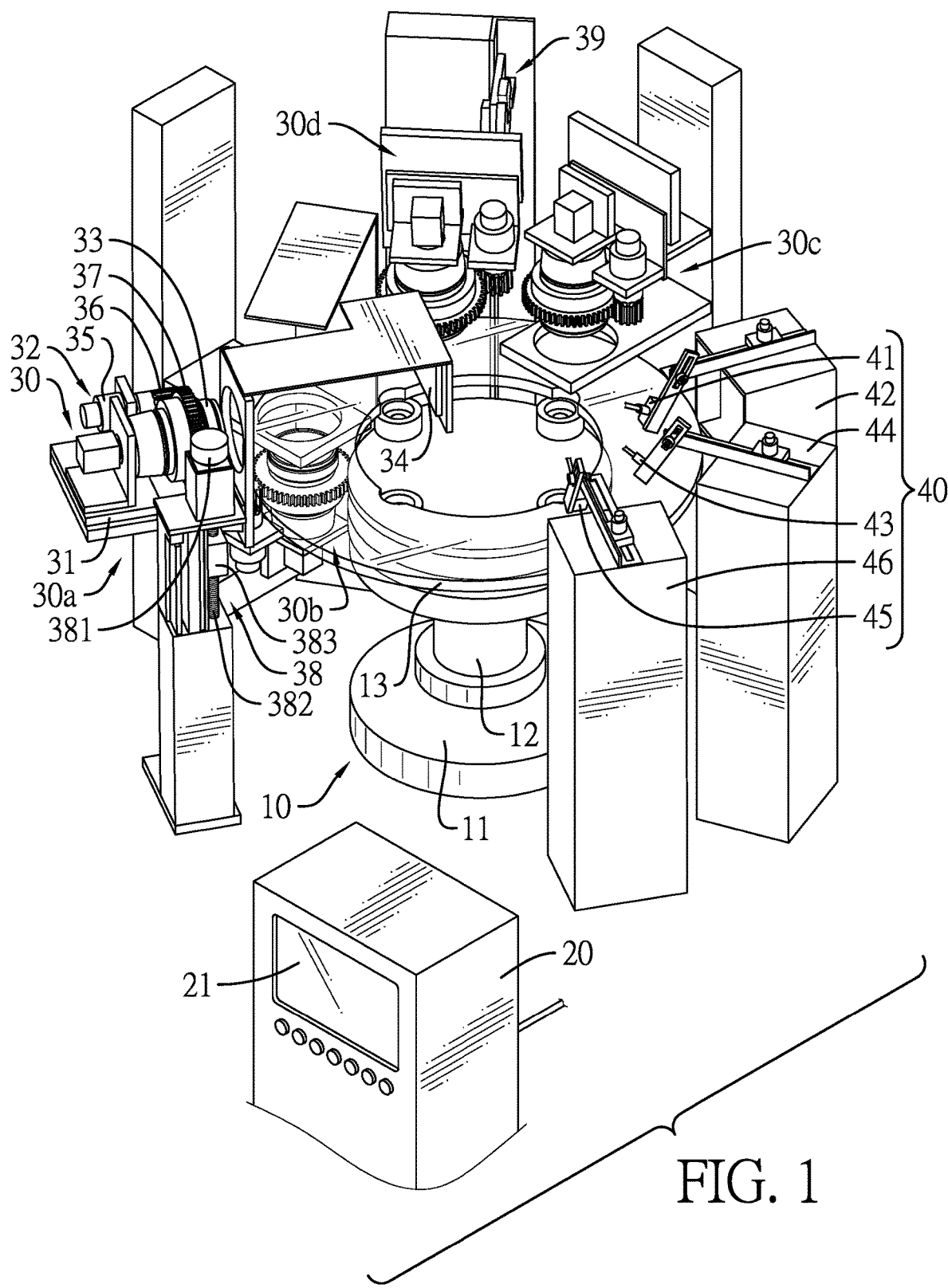
FIG. 1 is a perspective view of an image inspection device in accordance with the present invention.
Figure 2:
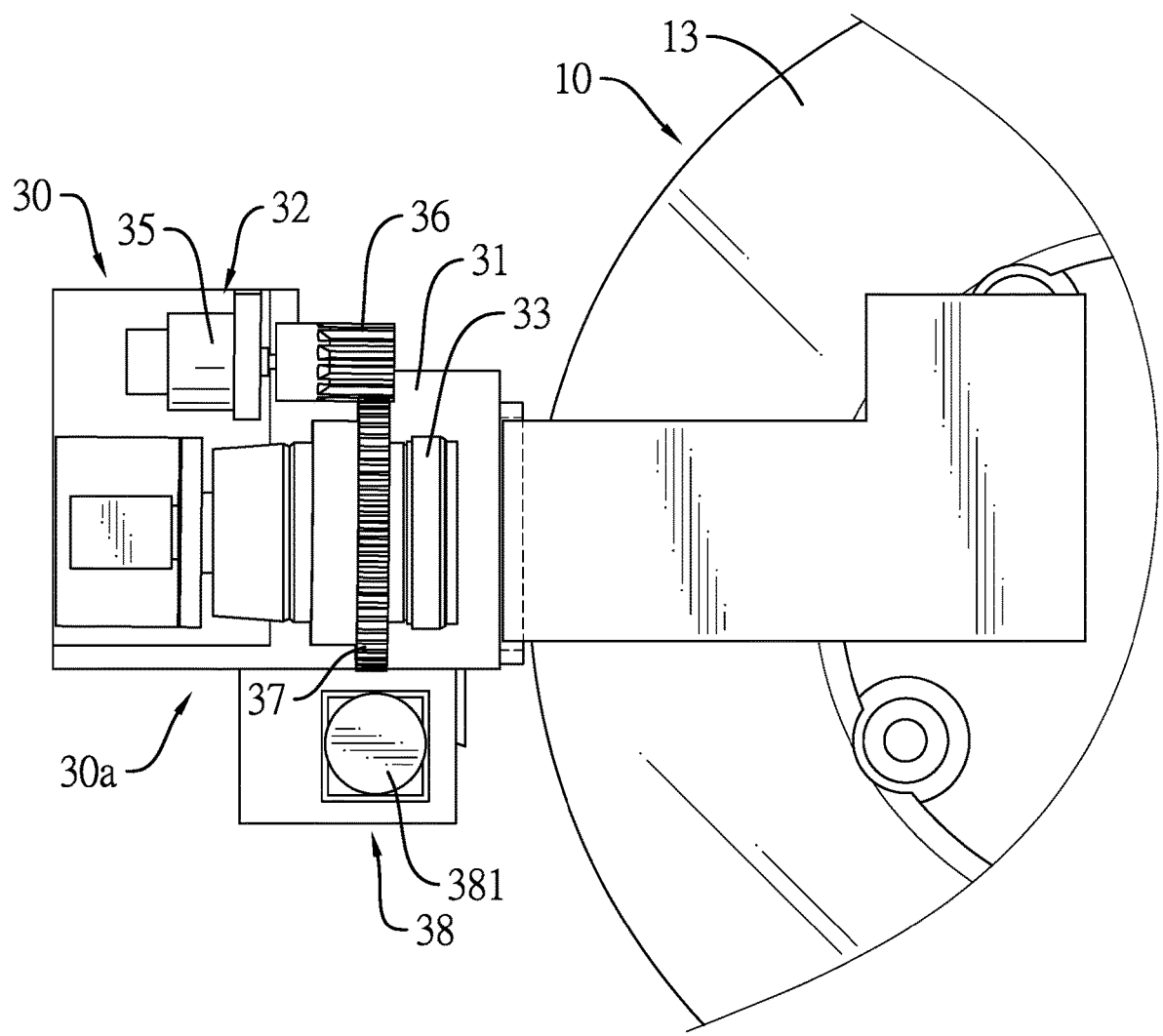
FIG. 2 is a partial top view of the image inspection device in FIG. 1.
Figure 3:
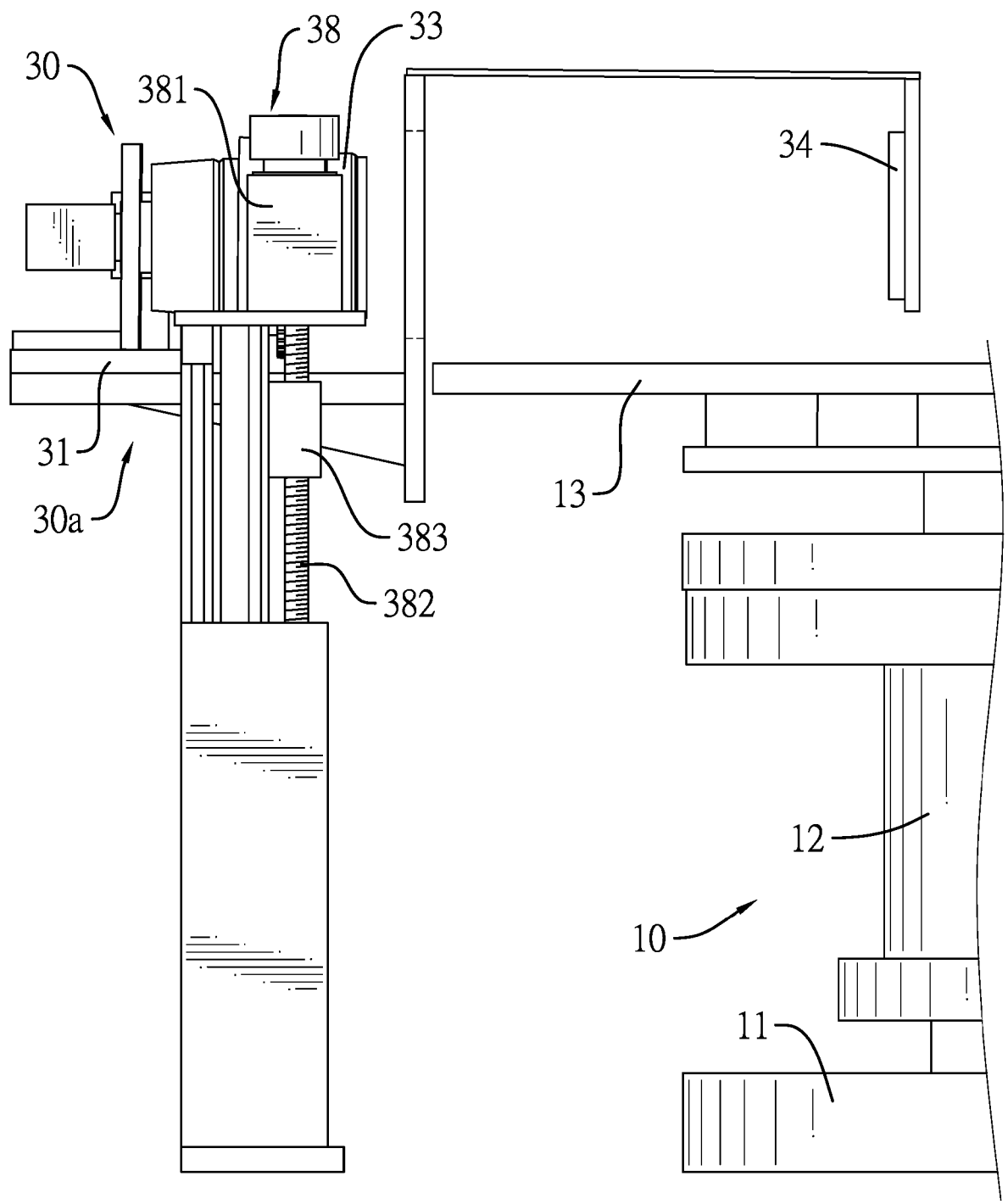
FIG. 3 is a side view of a lateral image capture unit of the image inspection device in FIG. 1.

With reference to FIGS. 1 to 3, an image inspection device in accordance with the present invention has a platform 10, a controlling unit 20, multiple image capture units 30, and a discharging unit 40.

With reference to FIGS. 1 to 3, the platform 10 has a base 11, a driving unit 12 and a carrier 13. The driving unit 12 is mounted to the base 11. The carrier 13 for carrying products under inspection is mounted to the driving unit 12 and is driven by the driving unit 12 to rotate. The carrier 13 is made of transparent materials such as glass or transparent acrylics.

With reference to FIG. 1, the controlling unit 20 is disposed adjacent to the platform 10 and is electrically connected to the driving unit 12 for controlling the driving unit 12 to drive the carrier 13 to rotate. The controlling unit 20 has a display 21 for showing digital information.

Figure 4:
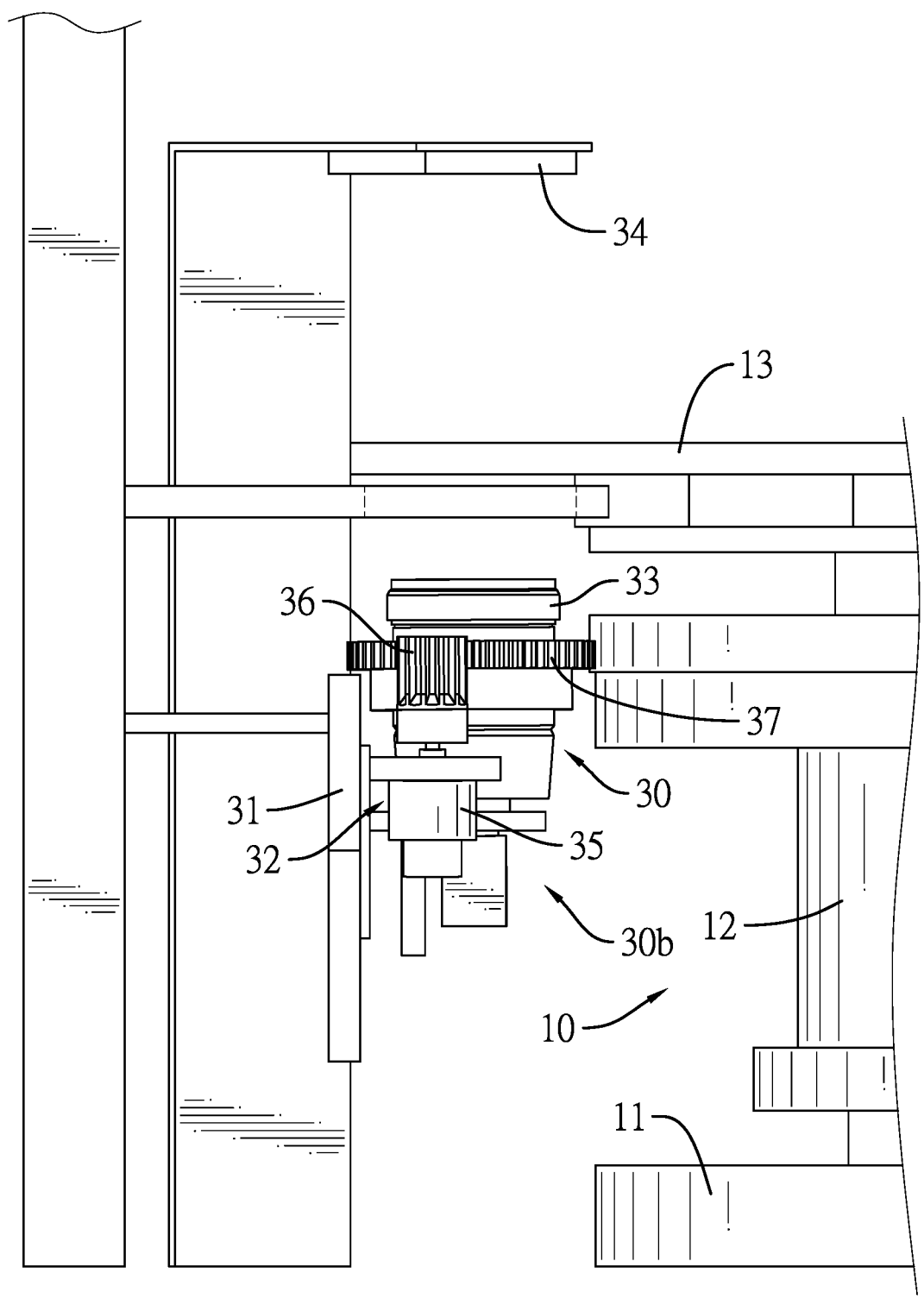
FIG. 4 is a side view of a bottom image capture unit of the image inspection device in FIG. 1.

With reference to FIGS. 1, 2, and 4, the image capture units 30 are disposed around the carrier 13, and are electrically connected to the controlling unit 20. The image capture units 30 are disposed adjacent to the carrier 13 and each one of the image capture units 30 has an assembling mount 31, a focusing assembly 32, a zoom lens 33, and a supplementary lighting element 34. The focusing assembly 32 is mounted to the assembling mount 31 and is electrically connected to the controlling unit 20. The zoom lens 33 is connected to the focusing assembly 32 and is driven by the focusing assembly 32 for focusing. The zoom lens 33 is electrically connected to the controlling unit 20 as well for transmitting digital information of images captured by the zoom lens 33. The supplementary lighting element 34 is mounted to the assembling mount 31 and is disposed in front of the zoom lens 33 to emit light into the zoom lens 33.

The focusing assembly 32 of each one of the image capture units 30 has a driving motor 35, a driving gear 36, and a driven gear 37. The driving motor 35 is mounted to the assembling mount 31 of the image capture unit 30. The driving gear 36 is mounted to the driving motor 35 of the image capture unit 30 and is driven by the driving motor 35. The driven gear 37 is mounted to the zoom lens 33 of the image capture unit 30, is engaged with the driving gear 36, and is capable of being driven by the driving motor 35 to rotate for focusing.

Figure 6:
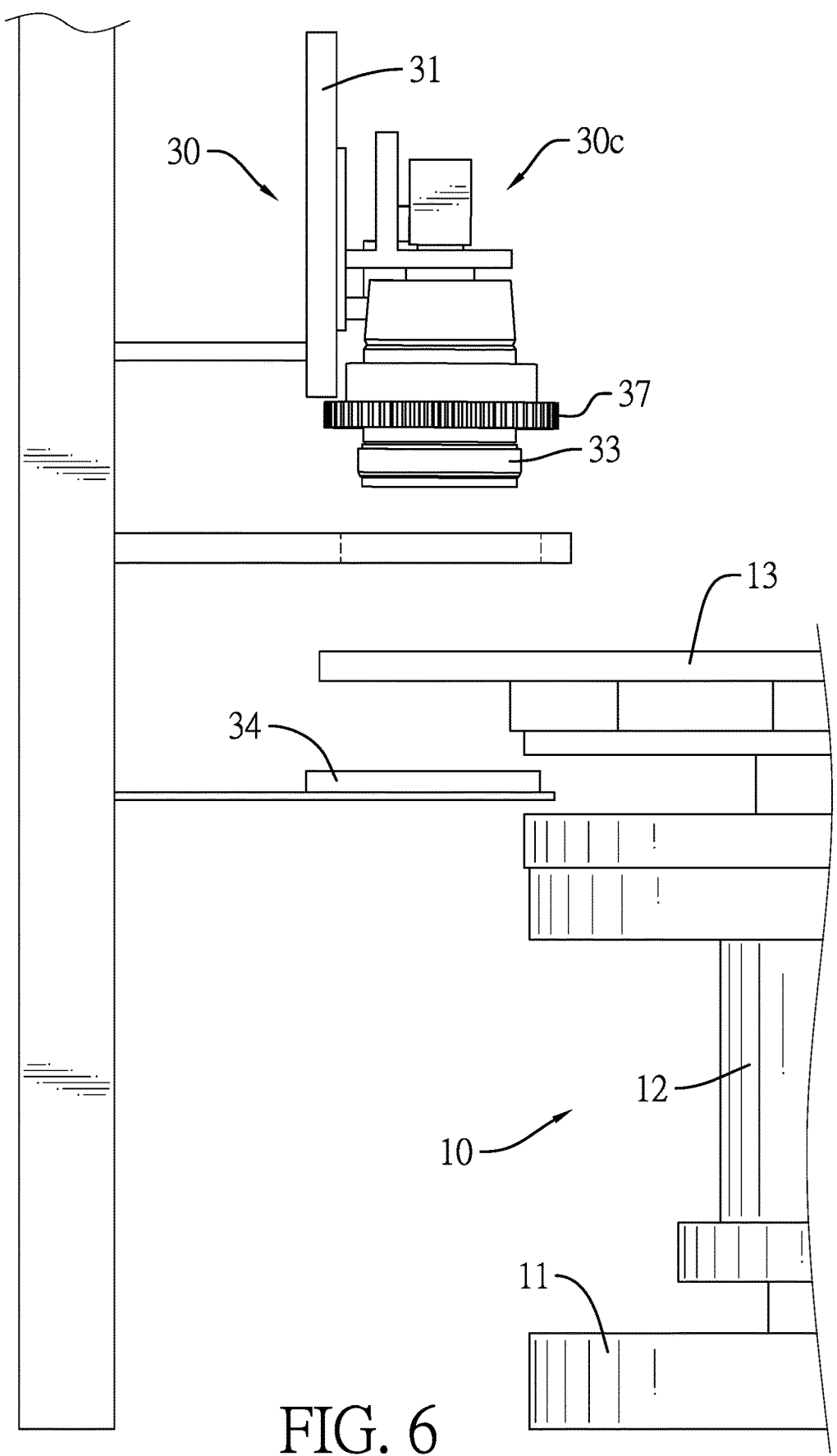
FIG. 6 is a side view of a top image capture unit of the image inspection device in FIG. 1.
Figure 7:
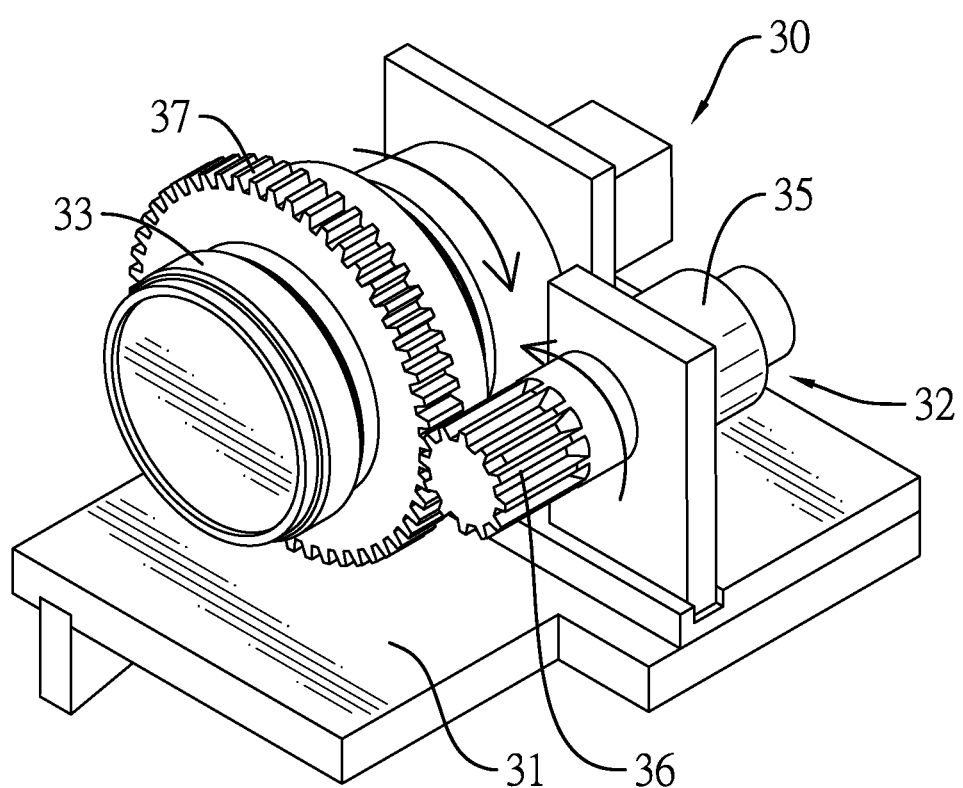
FIG. 7 is a perspective view of an image capture unit of the image inspection device in FIG. 1.

In the embodiment of the present invention, with reference to FIGS. 1, 4, and 6, the multiple image capture units 30 are further defined as a lateral image capture unit 30a, a bottom image capture unit 30b, a top image capture unit 30c, and a swingable image capture unit 30d. The lateral image capture unit 30a has an optical axis radially extending through a rotating axis of the carrier 13. The bottom image capture unit 30b is disposed below the carrier 13 and has an optical axis bottom-up extending through two flat faces of the carrier 13. The top image capture unit 30c is disposed above the carrier 13 and has an optical axis top-down extending through the two flat faces of the carrier 13. The swingable image capture unit 30d is disposed above the carrier 13 and has an optical axis. The swingable image capture unit 30d is capable of swinging to adjust an angle defined between the rotating axis of the carrier 13 and the optical axis of the swingable image capture unit 30d.

Figure 5:
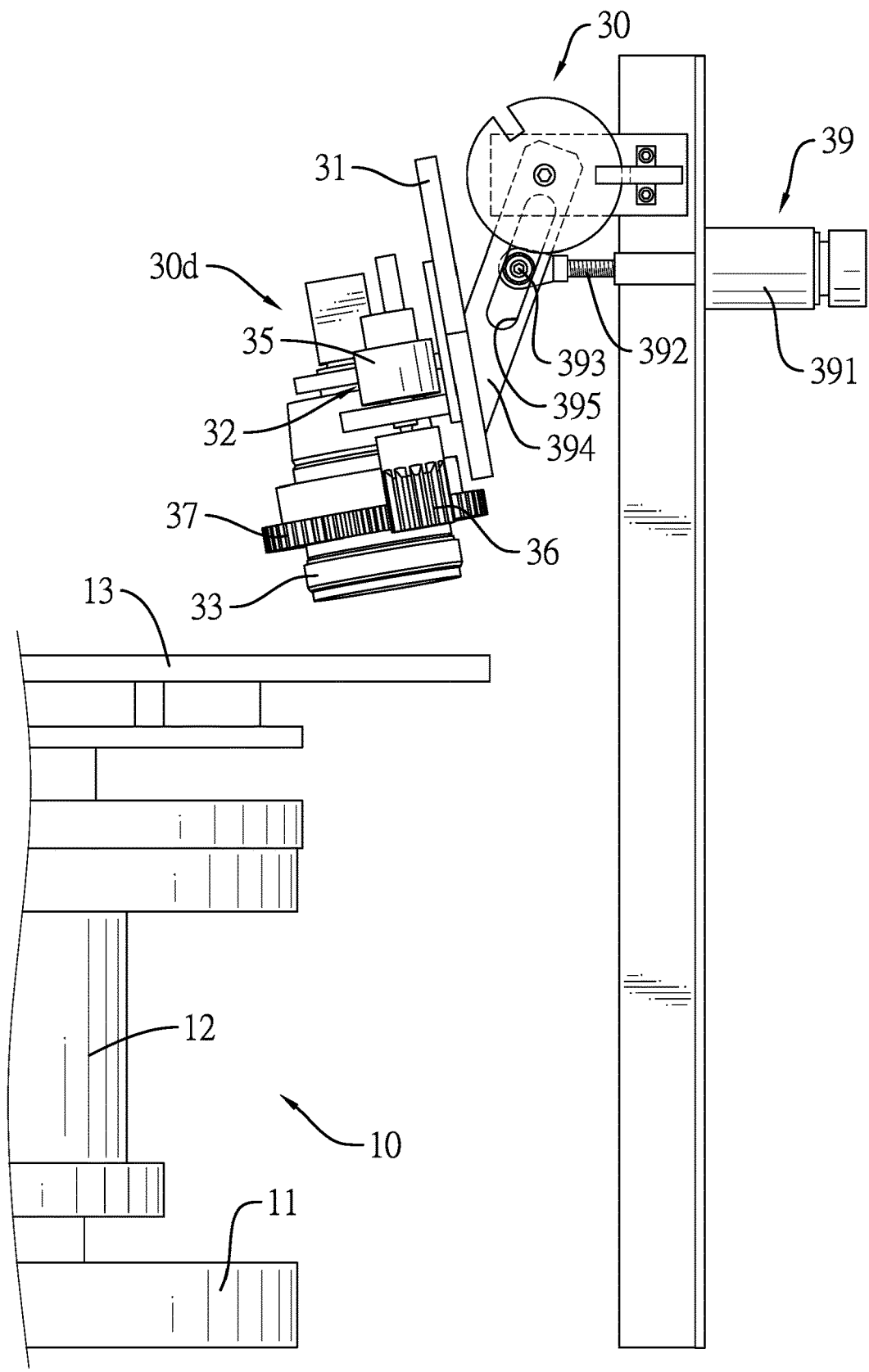
FIG. 5 is a side view of a swingable image capture unit of the image inspection device in FIG. 1.

With reference to FIGS. 1, 3, and 5, the lateral image capture unit 30a has an elevating unit 38 having a rotating motor 381, a screw shaft 382, and a nut 383. The rotating motor 381 is electrically connected to the controlling unit 20. The screw shaft 382 is connected to the rotating motor 381 and is driven by the rotating motor 381 for rotating. The nut 383 is connected to the assembling mount 31 of the lateral image capture unit 30a, is screwed with the screw shaft 382, and is capable of moving up and down along the screw shaft 382.

The swingable image capture unit 30d has a swinging unit 39 having a retracting motor 391, a retracting shaft 392, a slider 393, and a swinging arm 394. The retracting motor 391 is electrically connected to the controlling unit 20. The swinging arm 394 is capable of swinging, is connected to the assembling mount 31 of the swingable image capture unit 30d, and has an elongated groove 395. The retracting shaft 392 is connected to the retracting motor 391 and is driven by the retracting motor 391 for approaching the carrier 13 or moving away from the carrier 13. The slider 393 is connected to a terminal end of the retracting shaft 392 and extends in the elongated groove 395 to connect the retracting shaft 392 and the swinging arm 394. The slider 393 is able to move together with the retracting shaft 392 to push the swinging arm 394 for swinging toward or away from the carrier 13. In the embodiment of the present invention, the retracting motor 391 has a rotating sleeve capable of rotating, and the retracting shaft 392 is a screw bar. The rotating sleeve of the retracting motor 391 is screwed with the retracting shaft 392 and drives the retracting shaft 392 to rotate and to approach or move away from the carrier 13.

With reference to FIG. 1, the discharging unit 40 is configured to move the products under inspection away from the carrier 13. The discharging unit 40 is electrically connected to the controlling unit 20. The discharging unit 40 has a qualified-product discharging component 41, a qualified-product box 42, a defective-product discharging component 43, and a defective-product box 44. The qualified-product box 42 and the defective-product box 44 are disposed adjacent to the carrier 13. The qualified-product discharging component 41 and the defective-product discharging component 43 are disposed adjacent to the carrier 13 and are electrically connected to the controlling unit 20. The qualified-product discharging component 41 is configured to pneumatically discharge qualified products from the carrier 13 into the qualified-product box 42. The defective-product discharging component 43 is configured to pneumatically discharge defective products from the carrier 13 into the defective-product box 44.

The discharging unit 40 further has a re-examination discharging component 45 and a re-examination box 46. The re-examination discharging component 45 is disposed adjacent to the carrier 13 and is electrically connected to the controlling unit 20. The re-examination box 46 is disposed adjacent to the carrier 13. The re-examination discharging component 45 is configured to pneumatically discharge the products under inspection from the carrier 13 into the re-examination box 46.

For example, a hex bolt 50 is taken as a product under inspection. With reference to FIGS. 1, 2, 7, and 8, when the hex bolt 50 is placed in front of the zoom lens 33 of one of the image capture units 30, the driving motor 35 drives the driving gear 36, and the driving gear 36 drives the driven gear 37 to let the zoom lens 33 focus and capture clear images of the hex bolt 50. The driving gear 36 rotates for focusing and has a rotated number of teeth. The rotated number of teeth is recorded in the controlling unit 20. When the image capture unit 30 captures images of another hex bolt 50, the controlling unit 20 controls the focusing assembly 32 of the image capture unit 30 according to the rotated number of teeth recorded in the controlling unit 20. Consequently, the zoom lens 33 can focus without manually operating, can reduce personal error, and can avoid misjudgments of inspection. Furthermore, the assembling mount 31 of the image capture unit 30 is free from altering positions as the zoom lens 33 is focusing. Therefore, the zoom lens 33 of each one of the image capture units 30 is capable of focusing without being restricted by scene of inspection.

When the image inspection device in accordance with the present invention inspects different kinds of products rather than a hex bolt, the zoom lens 33 of each one of the image capture units 30 has to refocus. The rotated number of teeth of the driving gear 36 is recorded in the controlling unit 20 again to minimize personal errors, avoid misjudgments, and improve accuracy of focus.

Figure 8:
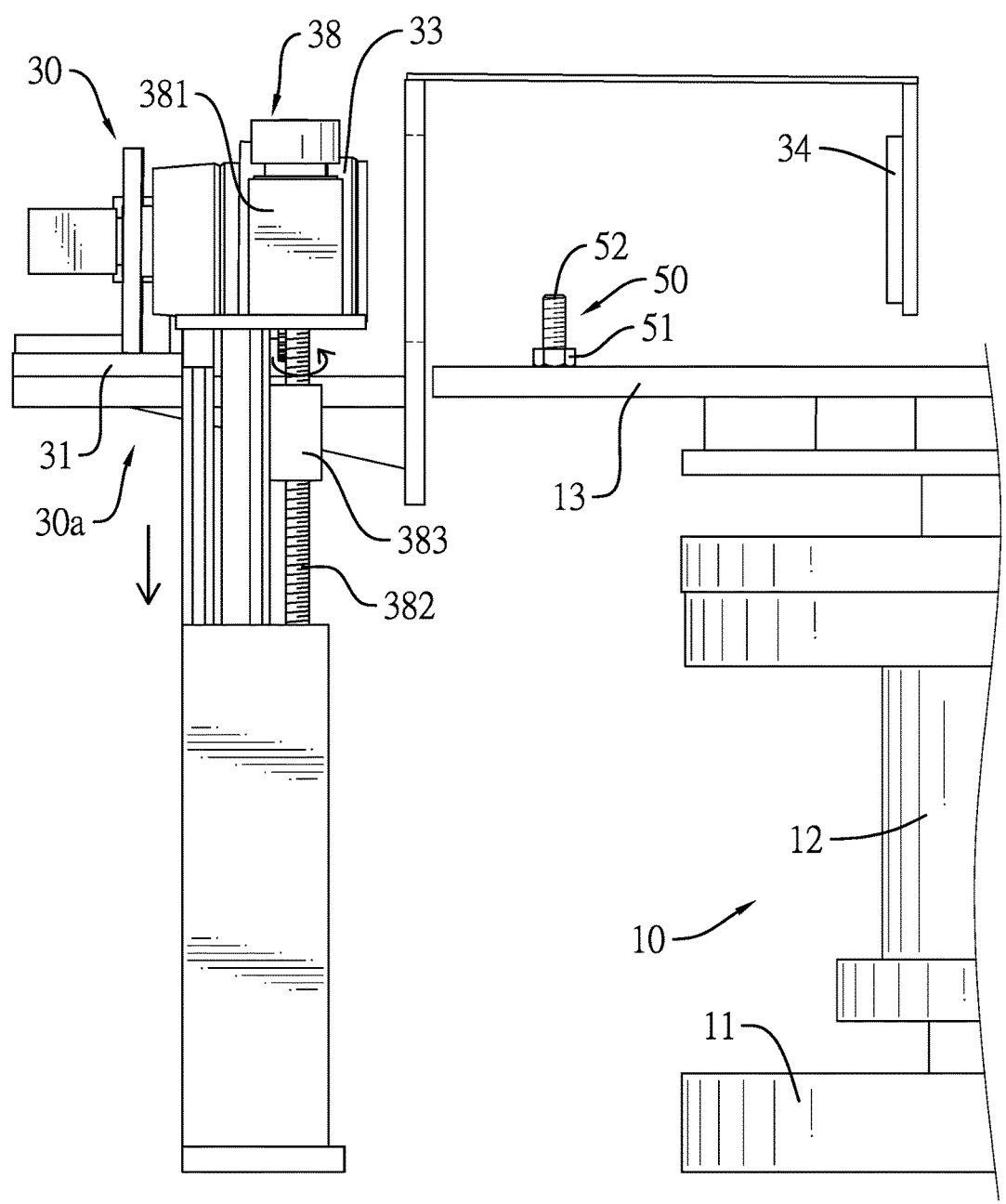
FIG. 8 is an operational side view of the lateral image capture unit of the image inspection device in FIG. 1.
Figure 10:
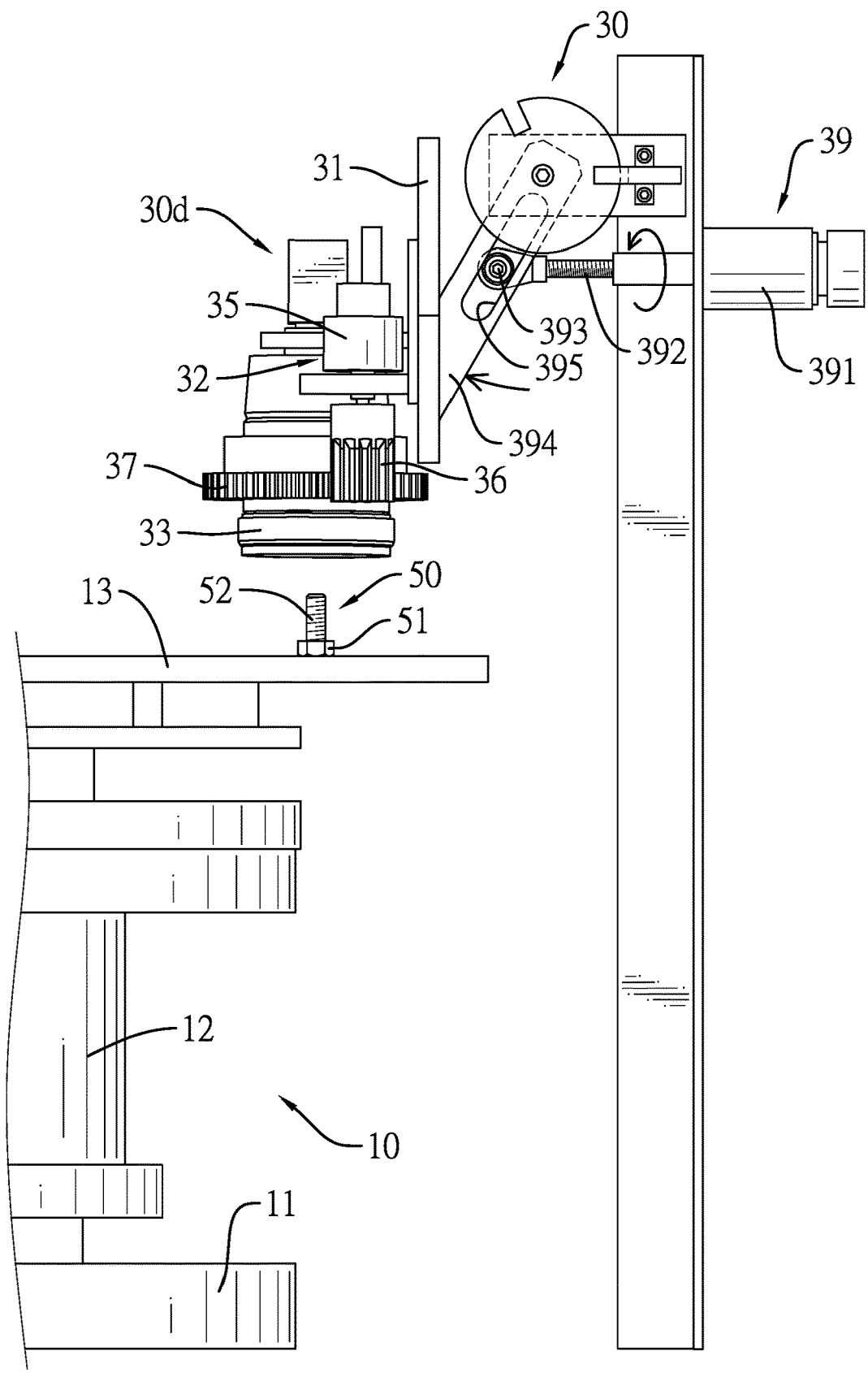
FIG. 10 is an operational side view of the swingable image capture unit of the image inspection device in FIG. 1.

With reference to FIGS. 1, 8, and 10, the height of the zoom lens 33 of the lateral capture unit 30a can be adjusted by the elevating unit 38. The controlling unit 20 controls the rotating motor 381 to drive the screw shaft 382 to let the nut 383 move up and down to adjust the height of the zoom lens 33 of the lateral capture unit 30a. The swinging unit 39 of the swingable image capture 30d can be controlled by the controlling unit 20. The retracting motor 391 drives the retracting shaft 392 to approach or to move away from the carrier 13. The slider 393 connected to the retracting shaft 392 can move along the elongated groove 395 of the swinging arm 394 to push the swinging arm 394 for swinging toward or away from the carrier 13. Shooting angle of the zoom lens 33 of the swingable image capture unit 30d is adjusted accordingly.

Figure 9:
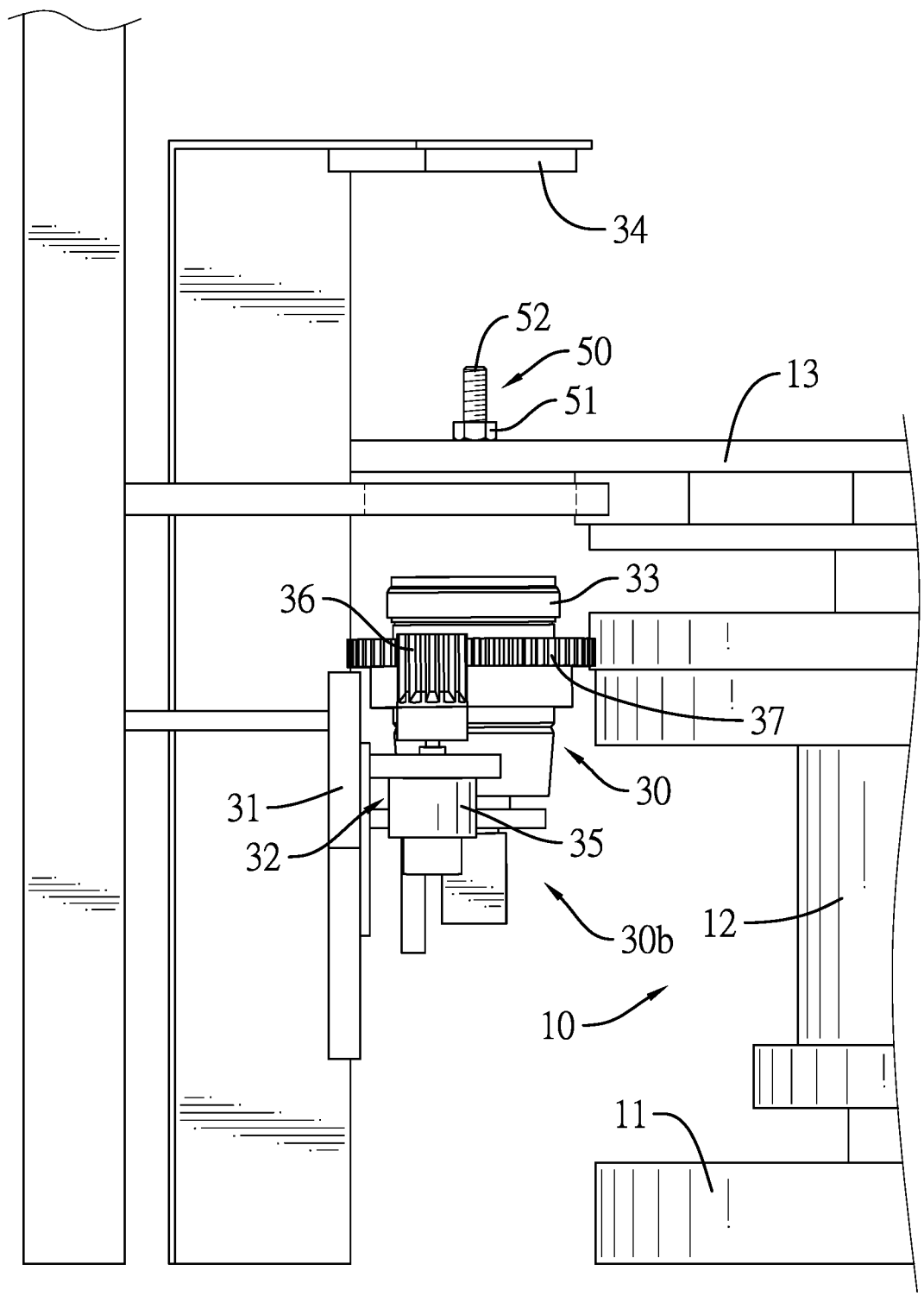
FIG. 9 is an operational side view of the bottom image capture unit of the image inspection device in FIG. 1.

With reference to FIGS. 1, 8, and 9, the hex bolt 50 has a bolt head 51 and a stud 52 formed on the bolt head 51. The bolt head 51 is placed on the carrier 13 and the stud 52 is disposed above the bolt head 51. The controlling unit 20 controls the driving unit 12 to drive the carrier 13 for rotating. The carrier 13 carries the hex bolt 50, and the hex bolt 50 passes the zoom lenses 33 of the image capture units 30 one by one. When the hex bolt 50 arrives at the lateral image capture unit 30a, the supplementary lighting element 34 of the lateral image capture unit 30a emits light to a lateral face of the hex bolt 50. The zoom lens 33 of the lateral image capture unit 30a captures lateral images of the hex bolt 50 and transmits digital information of the lateral images to the controlling unit 20. Next, the hex bolt 50 arrives at the bottom image capture unit 30b. The supplementary lighting element 34 of the bottom image capture unit 30b emits light to the hex bolt 50 from top to down. Therefore, the zoom lens 33 of the bottom image capture unit 30b clearly captures images of the bolt head 51 of the hex bolt 50 and transmits the images to the controlling unit 20.

Figure 11:
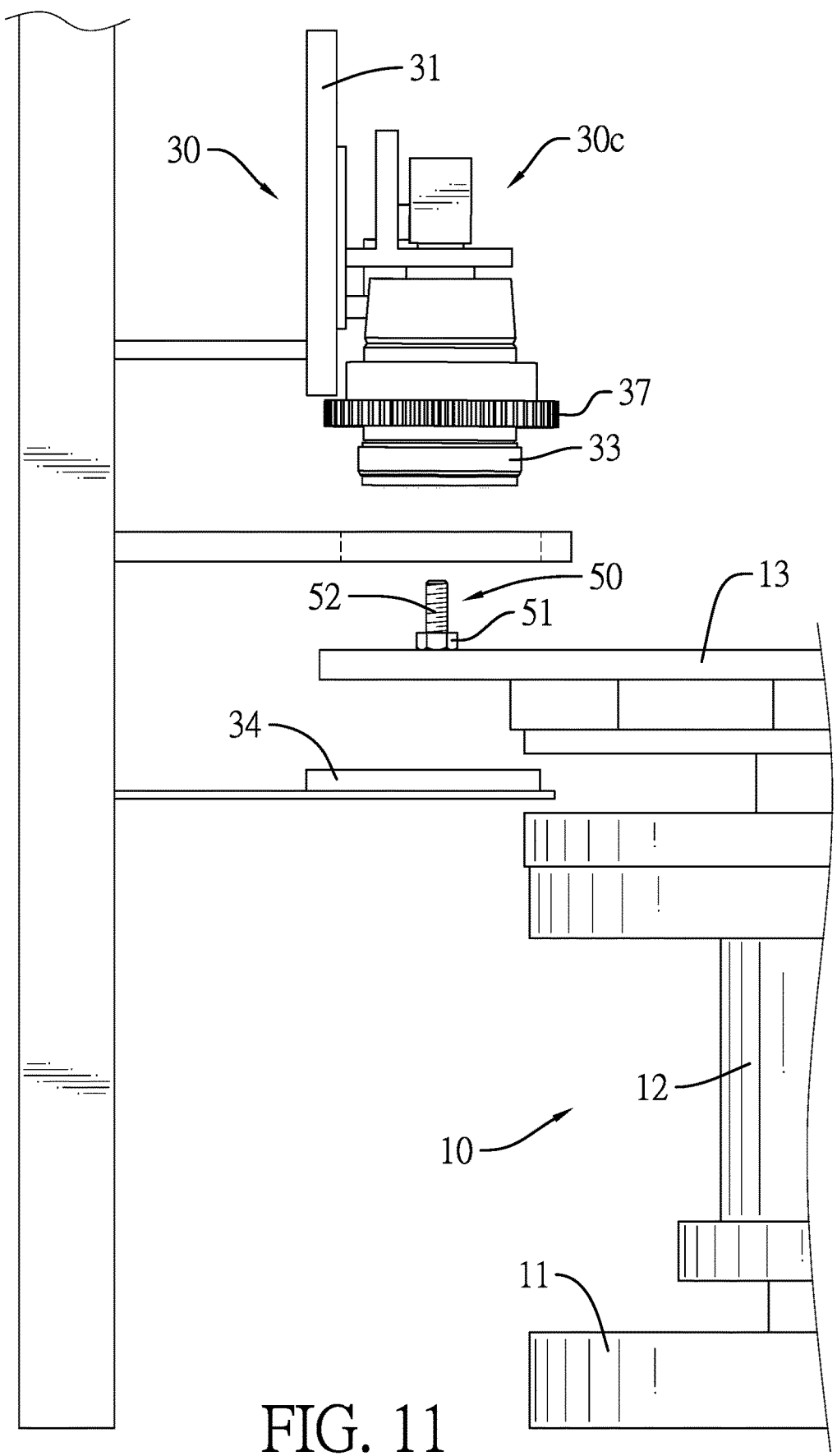
FIG. 11 is an operational side view of the top image capture unit of the image inspection device in FIG. 1.

With reference to FIGS. 10 and 11, the carrier 13 carries the hex bolt 50 to the swingable image capture unit 30d. The shooting angle of the zoom lens 33 of the swingable image capture unit 30d can be adjusted via the swinging unit 39. Therefore, the zoom lens 33 of the swingable image capture unit 30d can capture a joint portion of the bolt head 51 and the stud 52 of the hex bolt 50. Then, the carrier 13 carries the hex bolt 50 to the top image capture unit 30c. The supplementary lighting element 34 of the top image capture unit 30c emits light bottom-up. The zoom lens 33 of the top image capture unit 30c captures images of the bolt head 51 and transmits the images to the controlling unit 20. The controlling unit 20 distinguishes whether the hex bolt 50 is qualified according to the images transmitted by the image capture units 30.

With reference to FIG. 1, judgement of the controlling unit 20 is transmitted to the discharging unit 40. The qualified-product discharging component 41 blows qualified hex bolts into the qualified-product box 42. The defective-product discharging component 43 blows defective hex bolts into the defective-product box 44. In the embodiment of the present invention, if the controlling unit 20 fails to distinguish the hex bolt 50, the re-examination discharging component 45 blows the hex bolt 50 into the re-examination box 46, and the qualified-product discharging component 41 and the defective-product discharging component 43 do not operate.

In addition, the carrier 13 is made of glass, transparent acrylics, or other transparent materials, and the bottom image capture unit 30b can capture images of a bottom of the product under inspection. The supplementary lighting element 34 of each one of the multiple image capture units 30 can make the image capture units capture clear images. The display 21 of the controlling unit 20 is designed for staff monitoring inspection procedure readily. The staff can proceed troubleshooting immediately.

In conclusion, the focusing assembly 32 is controlled by the controlling unit 20, so focus of the zoom lens 33 of each one of the image capture units 30 is more accurate than manual focus. The images captured by the image capture units 30 are clear and can avoid misjudgments of the controlling unit 20. The assembling mount 31 of each one of the image capture units 30 is free from altering positions as the zoom lens 33 is focusing. Therefore, the zoom lens 33 of each one of the image capture units 30 is capable of focusing without being restricted by scene of inspection.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An image inspection device comprising: a platform having a base; a driving unit mounted to the base; a carrier made of transparent materials, mounted to the driving unit, and driven by the driving unit to rotate; and a controlling unit electrically connected to the driving unit for controlling the driving unit to drive the carrier; multiple image capture units disposed around the carrier, and each one of the image capture units having an assembling mount; a focusing assembly mounted to the assembling mount and electrically connected to the controlling unit; a zoom lens mounted to the assembling mount, connected to and driven by the focusing assembly for focusing, and electrically connected to the controlling unit for transmitting digital information of images captured by the zoom lens to the controlling unit; and a supplementary lighting element mounted to the assembling mount and disposed in front of the zoom lens of the image capture unit to emit light toward the zoom lens; and a discharging unit configured to move products under inspection away from the carrier, and electrically connected to the controlling unit; wherein the multiple image capture units include: a lateral image capture unit having an optical axis radially extending through a rotating axis of the carrier; a bottom image capture unit disposed below the carrier and having an optical axis bottom-up extending through two flat faces of the carrier; a top image capture unit disposed above the carrier and having an optical axis top-down extending through the two flat faces of the carrier; and a swingable image capture unit having an optical axis, and the swingable image capture unit disposed above the carrier and capable of swinging to adjust an angle defined between the rotating axis of the carrier and the optical axis of the swingable image capture unit; the swingable image capture unit having a swinging unit having a retracting motor electrically connected to the controlling unit a swinging arm having an elongated groove, capable of swinging, and connected to the assembling mount of the swingable image capture unit, a retracting shaft connected to the retracting motor and driven by the retracting motor for extending toward the carrier or away from the carrier, a slider connected to a terminal end of the retracting shaft, protruding in the elongated groove, and moving together with the retracting shaft to push the swinging arm for swinging toward or away from the carrier.

2. The image inspection device as claimed in claim 1, wherein the focusing assembly of each one of the image capture units has a driving motor mounted to the assembling mount of the image capture unit; a driving gear mounted to the driving motor of the image capture unit and driven by the driving motor; and a driven gear mounted to the zoom lens of the image capture unit, engaged with the driving gear, and driven by the driving motor to rotate for focusing.

3. The image inspection device as claimed in claim 1, wherein the lateral image capture unit has an elevating unit having a rotating motor electrically connected to the controlling unit; a screw shaft connected to the rotating motor and driven by the rotating motor for rotating; and a nut screwed with the screw shaft, capable of moving up and down along the screw shaft, and connected to the assembling mount of the lateral image capture unit.

4. The image inspection device as claimed in claim 1, wherein the controlling unit has a display for showing the digital information of the images captured by the zoom lens of each one of the image capture units.

5. The image inspection device as claimed in claim 3, wherein the controlling unit has a display for showing the digital information of the images captured by the zoom lens of each one of the image capture units.

6. The image inspection device as claimed in claim 1, wherein the discharging unit has a qualified-product box disposed adjacent to the carrier; a qualified-product discharging component disposed adjacent to the carrier, electrically connected to the controlling unit, and configured to discharge qualified products from the carrier into the qualified-product box; a defective-product box disposed adjacent to the carrier; and a defective-product discharging component disposed adjacent to the carrier, electrically connected to the controlling unit, and configured to discharge defective products from the carrier into the defective-product box.

7. The image inspection device as claimed in claim 3, wherein the discharging unit has a qualified-product box disposed adjacent to the carrier; a qualified-product discharging component disposed adjacent to the carrier, electrically connected to the controlling unit, and configured to discharge qualified products from the carrier into the qualified-product box; a defective-product box disposed adjacent to the carrier; and a defective-product discharging component disposed adjacent to the carrier, electrically connected to the controlling unit, and configured to discharge defective products from the earner into the defective; product box.

8. The image inspection device as claimed in claim 4, wherein the discharging unit has a qualified-product box disposed adjacent to the carrier; a qualified-product discharging component disposed adjacent to the carrier, electrically connected to the controlling unit, and configured to discharge qualified products from the carrier into the qualified-product box; a defective-product box disposed adjacent to the carrier; and a defective-product discharging component disposed adjacent to the carrier, electrically connected to the controlling unit, and configured to discharge defective products from the carrier into the defective-product box.

9. The image inspection device as claimed in claim 5, wherein the discharging unit has a qualified-product box disposed adjacent to the carrier; a qualified-product discharging component disposed adjacent to the carrier, electrically connected to the controlling unit, and configured to discharge qualified products from the carrier into the qualified-product box; a defective-product box disposed adjacent to the carrier; and a defective-product discharging component disposed adjacent to the carrier, electrically connected to the controlling unit, and configured to discharge defective products from the carrier into the defective-product box.

10. The image inspection device as claimed in claim 6, wherein the qualified-product discharging component pneumatically blows the qualified products; and the defective-product discharging component pneumatically blows the defective products.

11. The image inspection device as claimed in claim 7, wherein the qualified-product discharging component pneumatically blows the qualified products; and the defective-product discharging component pneumatically blows the defective products.

12. The image inspection device as claimed in claim 8, wherein the qualified-product discharging component pneumatically blows the qualified products; and the defective-product discharging component pneumatically blows the defective products.

13. The image inspection device as claimed in claim 9, wherein the qualified-product discharging component pneumatically blows the qualified products; and the defective-product discharging component pneumatically blows the defective products.

\* \* \* \* \*